US006321311B1

(12) United States Patent
Kim

(10) Patent No.: US 6,321,311 B1
(45) Date of Patent: Nov. 20, 2001

(54) INTERLEAVE READ ADDRESS GENERATOR

(75) Inventor: Dae-Jung Kim, Seoul (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/938,928

(22) Filed: Oct. 2, 1997

(30) Foreign Application Priority Data

Oct. 2, 1996 (KR) ................................................ 96-43731

(51) Int. Cl.7 ...................................................... G06F 12/00
(52) U.S. Cl. ............................................ 711/157; 711/217
(58) Field of Search .................................... 711/127, 113, 711/172, 103, 5, 157; 712/217; 379/112; 377/49; 375/295, 316; 710/35; 714/701

(56) References Cited

U.S. PATENT DOCUMENTS 4,860,325 * 8/1989 Aria et al. .............................. 377/29
5,136,588 8/1992 Ishijima ................................ 371/2.1
5,467,437 * 11/1995 Fuse .................................... 358/1.16
5,590,305 * 12/1996 Terrill et al. ......................... 711/103
5,659,580 8/1997 Partyka .
5,684,973 * 11/1997 Sullivan et al. ...................... 711/127
5,809,555 * 9/1998 Hobson ................................ 711/172
5,828,671 * 10/1998 Vela et al. ............................ 711/127
5,890,207 * 3/1999 Sne et al. ............................. 711/113

FOREIGN PATENT DOCUMENTS

2191914 A 12/1987 (GB) ............................... H04L/5/02

* cited by examiner

*Primary Examiner*—Do Hyun Yoo
*Assistant Examiner*—Fred F. Tzeng
(74) *Attorney, Agent, or Firm*—Robert E. Bushnell, Esq

(57) ABSTRACT

An interleave read address generator of an interleaver for use in a CDMA mobile communication terminal. The interleave read address generator includes a base-18 counter for counting a clock input on a base 18, to generate column address bits, a base-32 counter being enabled in response to a carry output from base-18 counter, for counting the clock input on a base 32 to generate row address bits, and a multiplexer for changing a position of output bits of base-32 counter according to data rate selection signals, to variably generate the row address bits.

20 Claims, 9 Drawing Sheets

| | | | | | | | | | | | | | | | | | |
|---|---|---|---|---|---|---|---|---|---|---|---|---|---|---|---|---|---|
| 1 | 33 | 65 | 97 | 129 | 161 | 193 | 225 | 257 | 289 | 321 | 353 | 385 | 417 | 449 | 481 | 513 | 545 |
| 2 | 34 | 66 | 98 | 130 | 162 | 194 | 226 | 258 | 290 | 322 | 354 | 386 | 418 | 450 | 482 | 514 | 546 |
| 3 | 35 | 67 | 99 | 131 | 163 | 195 | 227 | 259 | 291 | 323 | 355 | 387 | 419 | 451 | 483 | 515 | 547 |
| 4 | 36 | 68 | 100 | 132 | 164 | 196 | 228 | 260 | 292 | 324 | 356 | 388 | 420 | 452 | 484 | 516 | 548 |
| 5 | 37 | 69 | 101 | 133 | 165 | 197 | 229 | 261 | 293 | 325 | 357 | 389 | 421 | 453 | 485 | 517 | 549 |
| 6 | 38 | 70 | 102 | 134 | 166 | 198 | 230 | 262 | 294 | 326 | 358 | 390 | 422 | 454 | 486 | 518 | 550 |
| 7 | 39 | 71 | 103 | 135 | 167 | 199 | 231 | 263 | 295 | 327 | 359 | 391 | 423 | 455 | 487 | 519 | 551 |
| 8 | 40 | 72 | 104 | 136 | 168 | 200 | 232 | 264 | 296 | 328 | 360 | 392 | 424 | 456 | 488 | 520 | 552 |
| 9 | 41 | 73 | 105 | 137 | 169 | 201 | 233 | 265 | 297 | 329 | 361 | 393 | 425 | 457 | 489 | 521 | 553 |
| 10 | 42 | 74 | 106 | 138 | 170 | 202 | 234 | 266 | 298 | 330 | 362 | 394 | 426 | 458 | 490 | 522 | 554 |
| 11 | 43 | 75 | 107 | 139 | 171 | 203 | 235 | 267 | 299 | 331 | 363 | 395 | 427 | 459 | 491 | 523 | 555 |
| 12 | 44 | 76 | 108 | 140 | 172 | 204 | 236 | 268 | 300 | 332 | 364 | 396 | 428 | 460 | 492 | 524 | 556 |
| 13 | 45 | 77 | 109 | 141 | 173 | 205 | 237 | 269 | 301 | 333 | 365 | 397 | 429 | 461 | 493 | 525 | 557 |
| 14 | 46 | 78 | 110 | 142 | 174 | 206 | 238 | 270 | 302 | 334 | 366 | 398 | 430 | 462 | 494 | 526 | 558 |
| 15 | 47 | 79 | 111 | 143 | 175 | 207 | 239 | 271 | 303 | 335 | 367 | 399 | 431 | 463 | 495 | 527 | 559 |
| 16 | 48 | 80 | 112 | 144 | 176 | 208 | 240 | 272 | 304 | 336 | 368 | 400 | 432 | 464 | 496 | 528 | 560 |
| 17 | 49 | 81 | 113 | 145 | 177 | 209 | 241 | 273 | 305 | 337 | 369 | 401 | 433 | 465 | 497 | 529 | 561 |
| 18 | 50 | 82 | 114 | 146 | 178 | 210 | 242 | 274 | 306 | 338 | 370 | 402 | 434 | 466 | 498 | 530 | 562 |
| 19 | 51 | 83 | 115 | 147 | 179 | 211 | 243 | 275 | 307 | 339 | 371 | 403 | 435 | 467 | 499 | 531 | 563 |
| 20 | 52 | 84 | 116 | 148 | 180 | 212 | 244 | 276 | 308 | 340 | 372 | 404 | 436 | 468 | 500 | 532 | 564 |
| 21 | 53 | 85 | 117 | 149 | 181 | 213 | 245 | 277 | 309 | 341 | 373 | 405 | 437 | 469 | 501 | 533 | 565 |
| 22 | 54 | 86 | 118 | 150 | 182 | 214 | 246 | 278 | 310 | 342 | 374 | 406 | 438 | 470 | 502 | 534 | 566 |
| 23 | 55 | 87 | 119 | 151 | 183 | 215 | 247 | 279 | 311 | 343 | 375 | 407 | 439 | 471 | 503 | 535 | 567 |
| 24 | 56 | 88 | 120 | 152 | 184 | 216 | 248 | 280 | 312 | 344 | 376 | 408 | 440 | 472 | 504 | 536 | 568 |
| 25 | 57 | 89 | 121 | 153 | 185 | 217 | 249 | 281 | 313 | 345 | 377 | 409 | 441 | 473 | 505 | 537 | 569 |
| 26 | 58 | 90 | 122 | 154 | 186 | 218 | 250 | 282 | 314 | 346 | 378 | 410 | 442 | 474 | 506 | 538 | 570 |
| 27 | 59 | 91 | 123 | 155 | 187 | 219 | 251 | 283 | 315 | 347 | 379 | 411 | 443 | 475 | 507 | 539 | 571 |
| 28 | 60 | 92 | 124 | 156 | 188 | 220 | 252 | 284 | 316 | 348 | 380 | 412 | 444 | 476 | 508 | 540 | 572 |
| 29 | 61 | 93 | 125 | 157 | 189 | 221 | 253 | 285 | 317 | 349 | 381 | 413 | 445 | 477 | 509 | 541 | 573 |
| 30 | 62 | 94 | 126 | 158 | 190 | 222 | 254 | 286 | 318 | 350 | 382 | 414 | 446 | 478 | 510 | 542 | 574 |
| 31 | 63 | 95 | 127 | 159 | 191 | 223 | 255 | 287 | 319 | 351 | 383 | 415 | 447 | 479 | 511 | 543 | 575 |
| 32 | 64 | 96 | 128 | 160 | 192 | 224 | 256 | 288 | 320 | 352 | 384 | 416 | 448 | 480 | 512 | 544 | 576 |

FIG. 2

| | | | | | | | | | | | | | | | | | |
|---|---|---|---|---|---|---|---|---|---|---|---|---|---|---|---|---|---|
| 1 | 17 | 33 | 49 | 65 | 81 | 97 | 113 | 129 | 145 | 161 | 177 | 193 | 209 | 225 | 241 | 257 | 273 |
| 1 | 17 | 33 | 49 | 65 | 81 | 97 | 113 | 129 | 145 | 161 | 177 | 193 | 209 | 225 | 241 | 257 | 273 |
| 2 | 18 | 34 | 50 | 66 | 82 | 98 | 114 | 130 | 146 | 162 | 178 | 194 | 210 | 226 | 242 | 258 | 274 |
| 2 | 18 | 34 | 50 | 66 | 82 | 98 | 114 | 130 | 146 | 162 | 178 | 194 | 210 | 226 | 242 | 258 | 274 |
| 3 | 19 | 35 | 51 | 67 | 83 | 99 | 115 | 131 | 147 | 163 | 179 | 195 | 211 | 227 | 243 | 259 | 275 |
| 3 | 19 | 35 | 51 | 67 | 83 | 99 | 115 | 131 | 147 | 163 | 179 | 195 | 211 | 227 | 243 | 259 | 275 |
| 4 | 20 | 36 | 52 | 68 | 84 | 100 | 116 | 132 | 148 | 164 | 180 | 196 | 212 | 228 | 244 | 260 | 276 |
| 4 | 20 | 36 | 52 | 68 | 84 | 100 | 116 | 132 | 148 | 164 | 180 | 196 | 212 | 228 | 244 | 260 | 276 |
| 5 | 21 | 37 | 53 | 69 | 85 | 101 | 117 | 133 | 149 | 165 | 181 | 197 | 213 | 229 | 245 | 261 | 277 |
| 5 | 21 | 37 | 53 | 69 | 85 | 101 | 117 | 133 | 149 | 165 | 181 | 197 | 213 | 229 | 245 | 261 | 277 |
| 6 | 22 | 38 | 54 | 70 | 86 | 102 | 118 | 134 | 150 | 166 | 182 | 198 | 214 | 230 | 246 | 262 | 278 |
| 6 | 22 | 38 | 54 | 70 | 86 | 102 | 118 | 134 | 150 | 166 | 182 | 198 | 214 | 230 | 246 | 262 | 278 |
| 7 | 23 | 39 | 55 | 71 | 87 | 103 | 119 | 135 | 151 | 167 | 183 | 199 | 215 | 231 | 247 | 263 | 279 |
| 7 | 23 | 39 | 55 | 71 | 87 | 103 | 119 | 135 | 151 | 167 | 183 | 199 | 215 | 231 | 247 | 263 | 279 |
| 8 | 24 | 40 | 56 | 72 | 88 | 104 | 120 | 136 | 152 | 168 | 184 | 200 | 216 | 232 | 248 | 264 | 280 |
| 8 | 24 | 40 | 56 | 72 | 88 | 104 | 120 | 136 | 152 | 168 | 184 | 200 | 216 | 232 | 248 | 264 | 280 |
| 9 | 25 | 41 | 57 | 73 | 89 | 105 | 121 | 137 | 153 | 169 | 185 | 201 | 217 | 233 | 249 | 265 | 281 |
| 9 | 25 | 41 | 57 | 73 | 89 | 105 | 121 | 137 | 153 | 169 | 185 | 201 | 217 | 233 | 249 | 265 | 281 |
| 10 | 26 | 42 | 58 | 74 | 90 | 106 | 122 | 138 | 154 | 170 | 186 | 202 | 218 | 234 | 250 | 266 | 282 |
| 10 | 26 | 42 | 58 | 74 | 90 | 106 | 122 | 138 | 154 | 170 | 186 | 202 | 218 | 234 | 250 | 266 | 282 |
| 11 | 27 | 43 | 59 | 75 | 91 | 107 | 123 | 139 | 155 | 171 | 187 | 203 | 219 | 235 | 251 | 267 | 283 |
| 11 | 27 | 43 | 59 | 75 | 91 | 107 | 123 | 139 | 155 | 171 | 187 | 203 | 219 | 235 | 251 | 267 | 283 |
| 12 | 28 | 44 | 60 | 76 | 92 | 108 | 124 | 140 | 156 | 172 | 188 | 204 | 220 | 236 | 252 | 268 | 284 |
| 12 | 28 | 44 | 60 | 76 | 92 | 108 | 124 | 140 | 156 | 172 | 188 | 204 | 220 | 236 | 252 | 268 | 284 |
| 13 | 29 | 45 | 61 | 77 | 93 | 109 | 125 | 141 | 157 | 173 | 189 | 205 | 221 | 237 | 253 | 269 | 285 |
| 13 | 29 | 45 | 61 | 77 | 93 | 109 | 125 | 141 | 157 | 173 | 189 | 205 | 221 | 237 | 253 | 269 | 285 |
| 14 | 30 | 46 | 62 | 78 | 94 | 110 | 126 | 142 | 158 | 174 | 190 | 206 | 222 | 238 | 254 | 270 | 286 |
| 14 | 30 | 46 | 62 | 78 | 94 | 110 | 126 | 142 | 158 | 174 | 190 | 206 | 222 | 238 | 254 | 270 | 286 |
| 15 | 31 | 47 | 63 | 79 | 95 | 111 | 127 | 143 | 159 | 175 | 191 | 207 | 223 | 239 | 255 | 271 | 287 |
| 15 | 31 | 47 | 63 | 79 | 95 | 111 | 127 | 143 | 159 | 175 | 191 | 207 | 223 | 239 | 255 | 271 | 287 |
| 16 | 32 | 48 | 64 | 80 | 96 | 112 | 128 | 144 | 160 | 176 | 192 | 208 | 224 | 240 | 256 | 272 | 288 |
| 16 | 32 | 48 | 64 | 80 | 96 | 112 | 128 | 144 | 160 | 176 | 192 | 208 | 224 | 240 | 256 | 272 | 288 |

FIG. 3

| | | | | | | | | | | | | | | | | | |
|---|---|---|---|---|---|---|---|---|---|---|---|---|---|---|---|---|---|
| 1 | 9 | 17 | 25 | 33 | 41 | 49 | 57 | 65 | 73 | 81 | 89 | 97 | 105 | 113 | 121 | 129 | 137 |
| 1 | 9 | 17 | 25 | 33 | 41 | 49 | 57 | 65 | 73 | 81 | 89 | 97 | 105 | 113 | 121 | 129 | 137 |
| 1 | 9 | 17 | 25 | 33 | 41 | 49 | 57 | 65 | 73 | 81 | 89 | 97 | 105 | 113 | 121 | 129 | 137 |
| 1 | 9 | 17 | 25 | 33 | 41 | 49 | 57 | 65 | 73 | 81 | 89 | 97 | 105 | 113 | 121 | 129 | 137 |
| 2 | 10 | 18 | 26 | 34 | 42 | 50 | 58 | 66 | 74 | 82 | 90 | 98 | 106 | 114 | 122 | 130 | 138 |
| 2 | 10 | 18 | 26 | 34 | 42 | 50 | 58 | 66 | 74 | 82 | 90 | 98 | 106 | 114 | 122 | 130 | 138 |
| 2 | 10 | 18 | 26 | 34 | 42 | 50 | 58 | 66 | 74 | 82 | 90 | 98 | 106 | 114 | 122 | 130 | 138 |
| 2 | 10 | 18 | 26 | 34 | 42 | 50 | 58 | 66 | 74 | 82 | 90 | 98 | 106 | 114 | 122 | 130 | 138 |
| 3 | 11 | 19 | 27 | 35 | 43 | 51 | 59 | 67 | 75 | 83 | 91 | 99 | 107 | 115 | 123 | 131 | 139 |
| 3 | 11 | 19 | 27 | 35 | 43 | 51 | 59 | 67 | 75 | 83 | 91 | 99 | 107 | 115 | 123 | 131 | 139 |
| 3 | 11 | 19 | 27 | 35 | 43 | 51 | 59 | 67 | 75 | 83 | 91 | 99 | 107 | 115 | 123 | 131 | 139 |
| 3 | 11 | 19 | 27 | 35 | 43 | 51 | 59 | 67 | 75 | 83 | 91 | 99 | 107 | 115 | 123 | 131 | 139 |
| 4 | 12 | 20 | 28 | 36 | 44 | 52 | 60 | 68 | 76 | 84 | 92 | 100 | 108 | 116 | 124 | 132 | 140 |
| 4 | 12 | 20 | 28 | 36 | 44 | 52 | 60 | 68 | 76 | 84 | 92 | 100 | 108 | 116 | 124 | 132 | 140 |
| 4 | 12 | 20 | 28 | 36 | 44 | 52 | 60 | 68 | 76 | 84 | 92 | 100 | 108 | 116 | 124 | 132 | 140 |
| 4 | 12 | 20 | 28 | 36 | 44 | 52 | 60 | 68 | 76 | 84 | 92 | 100 | 108 | 116 | 124 | 132 | 140 |
| 5 | 13 | 21 | 29 | 37 | 45 | 53 | 61 | 69 | 77 | 85 | 93 | 101 | 109 | 117 | 125 | 133 | 141 |
| 5 | 13 | 21 | 29 | 37 | 45 | 53 | 61 | 69 | 77 | 85 | 93 | 101 | 109 | 117 | 125 | 133 | 141 |
| 5 | 13 | 21 | 29 | 37 | 45 | 53 | 61 | 69 | 77 | 85 | 93 | 101 | 109 | 117 | 125 | 133 | 141 |
| 5 | 13 | 21 | 29 | 37 | 45 | 53 | 61 | 69 | 77 | 85 | 93 | 101 | 109 | 117 | 125 | 133 | 141 |
| 6 | 14 | 22 | 30 | 38 | 46 | 54 | 62 | 70 | 78 | 86 | 94 | 102 | 110 | 118 | 126 | 134 | 142 |
| 6 | 14 | 22 | 30 | 38 | 46 | 54 | 62 | 70 | 78 | 86 | 94 | 102 | 110 | 118 | 126 | 134 | 142 |
| 6 | 14 | 22 | 30 | 38 | 46 | 54 | 62 | 70 | 78 | 86 | 94 | 102 | 110 | 118 | 126 | 134 | 142 |
| 6 | 14 | 22 | 30 | 38 | 46 | 54 | 62 | 70 | 78 | 86 | 94 | 102 | 110 | 118 | 126 | 134 | 142 |
| 7 | 15 | 23 | 31 | 39 | 47 | 55 | 63 | 71 | 79 | 87 | 95 | 103 | 111 | 119 | 127 | 135 | 143 |
| 7 | 15 | 23 | 31 | 39 | 47 | 55 | 63 | 71 | 79 | 87 | 95 | 103 | 111 | 119 | 127 | 135 | 143 |
| 7 | 15 | 23 | 31 | 39 | 47 | 55 | 63 | 71 | 79 | 87 | 95 | 103 | 111 | 119 | 127 | 135 | 143 |
| 7 | 15 | 23 | 31 | 39 | 47 | 55 | 63 | 71 | 79 | 87 | 95 | 103 | 111 | 119 | 127 | 135 | 143 |
| 8 | 16 | 24 | 32 | 40 | 48 | 56 | 64 | 72 | 80 | 88 | 96 | 104 | 112 | 120 | 128 | 136 | 144 |
| 8 | 16 | 24 | 32 | 40 | 48 | 56 | 64 | 72 | 80 | 88 | 96 | 104 | 112 | 120 | 128 | 136 | 144 |
| 8 | 16 | 24 | 32 | 40 | 48 | 56 | 64 | 72 | 80 | 88 | 96 | 104 | 112 | 120 | 128 | 136 | 144 |
| 8 | 16 | 24 | 32 | 40 | 48 | 56 | 64 | 72 | 80 | 88 | 96 | 104 | 112 | 120 | 128 | 136 | 144 |

FIG. 4

| | | | | | | | | | | | | | | | | | |
|---|---|---|---|---|---|---|---|---|---|---|---|---|---|---|---|---|---|
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |

FIG. 5

| DATA RATE | READING SEQUENCE OF ROW |
|---|---|
| 9600 & 14400bps | 1 2 3 4 5 6 7 8 9 10 11 12 13 14 15 16 17 18 19 20 21 22 23 24 25 26 27 28 29 30 31 32 |
| 4800 & 7200bps | 1 3 2 4 5 7 6 8 9 11 10 12 13 15 14 16 17 19 18 20 21 23 22 24 25 27 26 28 29 31 30 32 |
| 2400 & 3600bps | 1 5 2 6 3 7 4 8 9 13 10 14 11 15 12 16 17 21 18 22 19 23 20 24 25 29 26 30 27 31 28 32 |
| 1200 & 1800bps | 1 9 2 10 3 11 4 12 5 13 6 14 7 15 8 16 17 25 18 26 19 27 20 28 21 29 22 30 23 31 24 32 |

FIG. 6

INTERLEAVE READ ADDRESS GENERATOR

CLAIM OF PRIORITY

This application makes reference to, incorporates the same herein, and claims all benefits accruing under 35 U.S.C §119 from an application entitled *Interleave Read Address Generator* earlier filed in the Korean Industrial Property Office on Oct. 2, 1996, and there duly assigned Serial No. 96-43731 by that Office.

BACKGROUND OF THE INVENTION

1. Field of the Invention

The present invention relates to an interleaver for use in a CDMA (Code division Multiple Access) PCS (Personal Communications Services) mobile station, and more particularly to an interleave read address generator for generating an interleave read address for reading out data written in an interleave memory.

2. Description of the Related Art

In accordance with Standard SP-3384 for a CDMA PCS mobile station, it is specified that a CDMA PCS mobile station should perform an interleaving in order to prevent a burst error of a reverse channel. The interleaving is achieved by successively writing transmission data into an interleave memory and then successively reading out the data from the interleave memory.

A prior art interleaver necessarily includes an expensive ROM into which the interleave read address is written, thus increasing the cost of manufacturing the interleaver. Typically, in accordance with the above stated Standard SP-3384, the interleaver has a variable data rate. In other words, Standard SP-3384 specifies a data rate of 9600 bps and 14400 bps, a data rate of 4800 bps and 7200 bps, a data rate of 2400 bps and 3600 bps, and a data rate of 1200 bps and 1800 bps. The interleaver should perform the interleaving differently with respect to the respective data rates. Accordingly, a CDMA system with the variable data rate needs to include a ROM into which the interleave read addresses is written with respect to the respective data rates, in order to perform the interleaving. When the data rate is variable as stated above, the ROM has an increased amount of the data to stored therein, thus the ROM needs to have an increased capacity.

As described in the foregoing, the prior art interleaver uses the ROM into which the interleave read address is written with respect to each data rate, thereby resulting into an increase in cost. In particular, when the CDMA PCS mobile station is operated based on the Standard SP-3384, the ROM should needs increased capacity, consequently raising a problem of an increase in cost.

An exemplary data interleaver is provided by U.S. Pat. No. 5,659,580 to Andrzej F. Partyka entitled *Data Interleaver For Use With Mobile Communications Systems And Having A Contiguous Counter And Address Twister.*

SUMMARY OF THE INVENTION

It is therefore an object of the present invention to provide a simple interleave read address generator composed of counters and logic gates.

According to an aspect of the present invention, an interleave read address generator includes a base-18 counter for counting a clock input on a base 18, to generate column address bits, a base-32 counter being enabled in response to a carry output from the base-18 counter, for counting the clock input on a base 32 to generate row address bits, and a multiplexer for changing a position of output bits of the base-32 counter according to data rate selection signals, to variably generate the row address bits.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 2 is a diagram for showing a data arrangement when data is written into an interleave memory at data rate of 9600 bps and 14400 bps;

FIG. 3 is a diagram for showing a data arrangement when data is written into the interleave memory at a data rate of 4800 bps and 7200 bps;

FIG. 4 is a diagram for showing a data arrangement when data is written into the interleave memory at a data rate of 2400 bps and 3600 bps;

FIG. 5 is a diagram for showing a data arrangement when data is written into the interleave memory at a data rate of 1200 bps and 1800 bps;

FIG. 6 is a diagram for showing a reading sequence of rows for reading out data written into the interleave memory with respect to respective data rates;

DETAILED DESCRIPTION OF THE PREFERRED EMBODIMENT

Figure 1:
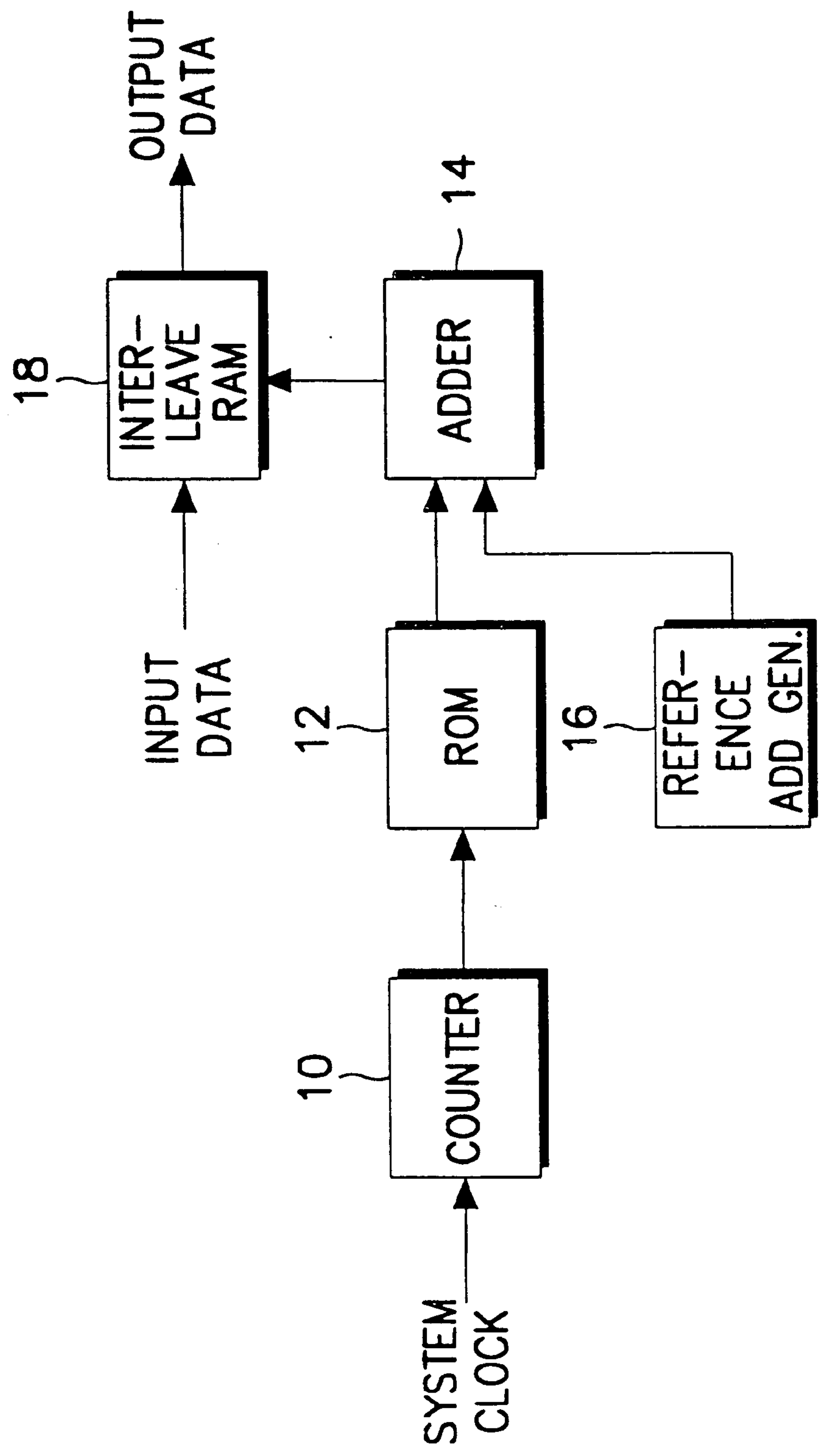
FIG. 1 is an exemplary block diagram of an interleaver using a ROM as an interleave memory for storing interleave read addresses.

A preferred embodiment of the present invention will be described in detail hereinbelow with reference to the attached drawings, in which the like reference numerals represent the like elements. Further, it should be clearly understood that many specifics such as the detailed circuit elements are shown only by way of an example to bring a better understanding of the present invention and the present invention may be embodied without the specifics. Moreover, it should be noted that detailed descriptions on the related prior art may be intentionally omitted if it is believed to be unnecessary in describing the concepts of the present invention.

Referring to FIG. 1, a prior art interleaver for achieving the interleaving includes a counter 10, a ROM (Read Only Memory) 12, an adder 14, a reference address generator 16, and an interleave RAM (Random Access Memory) 18. Counter 10 counts a system clock and applies the count value to ROM 12 into which an interleave read address corresponding to the count value is written. Upon receiving the count value, ROM 12 generates the interleave read address corresponding to the count value. Reference address generator 16 generates a reference address for reading and writing data from/into interleave RAM 18. Adder 14 adds the interleave read address output from ROM 12 to the reference address output from reference address generator 16, to generate the interleave read address with which interleave RAM 18 reads out the data stored therein. Interleave RAM 18 writes data, i.e., stores data, input from an exterior source, and reads out the data written therein according to the interleave read address output from adder 14.

FIG. 2 illustrates a data arrangement of an interleave memory such as a RAM, when data is written at a data rate of 9600 bps and 14400 bps in accordance with Standard SP-3384 for a CDMA PCS mobile station. In the drawing, since the number of the written data is the same as the number is of the addresses, the numbers shown in FIG. 2 are the same to the addresses on the interleave memory. In other words, a number '1' first data and an address at a first row and the first column, and a number '2' represents second data and an address at a second row and the first column. In the similar way, a number '3' represents third data and an address at a third row and the first column. The other numbers represent the corresponding data and addresses, as described in the foregoing. It should be noted that such an address arrangement is identically applied at the other data rates.

Referring to FIG. 2, the data are sequentially written in the order of the address at the data rate of 9600 bps and 14400 bps, and the written data are read out according to the interleave read address during the interleaving. FIG. 6 illustrates a reading sequence of the row addresses out of the interleave read addresses. As illustrated, the reading sequence of the rows at the data rate of 9600 bps and 14400 bps is 1, 2, 3, 4, . . . , 32. Once the reading sequence of the rows is determined, the data written on the whole eighteen columns of the determined rows are sequentially read out.

Figure 7:
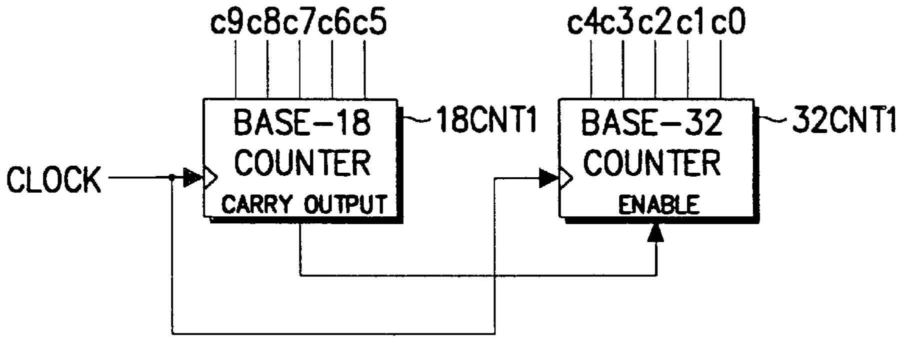
FIG. 7 is a diagram of an interleave read address generator for generating an interleave read address for reading data at the data rate of 9600 bps and 14400 bps according to an embodiment of the present invention.

That is, with reference to FIG. 2, the reading sequence of the data at the data rate of 9600 bps and 14400 bps is 1, 33, 65, 97, 129, . . . , 545, 2, 34, . . . , and 576. FIG. 7 illustrates an interleave read address generator for generating the interleave read address in accordance with the above mentioned data reading sequence. The interleave read address generator includes a base-18 (octodecimal) counter 18CNT1 and a base-32 counter 32CNT1.

The interleave read addresses are represented by five column address bits c9, c8, c7, c6 and c5, and five row address bits c4, c3, c2, c1 and c0, respectively. As shown in Table 1, 32 rows are represented by the row address bits c4, c3, c2, c1 and c0. It should be noted that the rows can be identically represented by the row address bits c4, c3, c2, c1 and c0, at the other data rates.

<TABLE 1>

| | Bits | | | | |
|---|---|---|---|---|---|
| Rows | c4 | c3 | c2 | c1 | c0 |
| 1 | 0 | 0 | 0 | 0 | 0 |
| 2 | 0 | 0 | 0 | 0 | 1 |
| 3 | 0 | 0 | 0 | 1 | 0 |
| 4 | 0 | 0 | 0 | 1 | 1 |
| 5 | 0 | 0 | 1 | 0 | 0 |
| 6 | 0 | 0 | 1 | 0 | 1 |
| 7 | 0 | 0 | 1 | 1 | 0 |
| 8 | 0 | 0 | 1 | 1 | 1 |
| 9 | 0 | 1 | 0 | 0 | 0 |
| 10 | 0 | 1 | 0 | 0 | 1 |
| 11 | 0 | 1 | 0 | 1 | 0 |
| 12 | 0 | 1 | 0 | 1 | 1 |
| 13 | 0 | 1 | 1 | 0 | 0 |
| 14 | 0 | 1 | 1 | 0 | 1 |
| 15 | 0 | 1 | 1 | 1 | 0 |
| 16 | 0 | 1 | 1 | 1 | 1 |
| 17 | 1 | 0 | 0 | 0 | 0 |
| 18 | 1 | 0 | 0 | 0 | 1 |
| 19 | 1 | 0 | 0 | 1 | 0 |
| 20 | 1 | 0 | 0 | 1 | 1 |
| 21 | 1 | 0 | 1 | 0 | 0 |
| 22 | 1 | 0 | 1 | 0 | 1 |
| 23 | 1 | 0 | 1 | 1 | 0 |
| 24 | 1 | 0 | 1 | 1 | 1 |
| 25 | 1 | 1 | 0 | 0 | 0 |
| 26 | 1 | 1 | 0 | 0 | 1 |
| 27 | 1 | 1 | 0 | 1 | 0 |
| 28 | 1 | 1 | 0 | 1 | 1 |
| 29 | 1 | 1 | 1 | 0 | 0 |
| 30 | 1 | 1 | 1 | 0 | 1 |
| 31 | 1 | 1 | 1 | 1 | 0 |
| 32 | 1 | 1 | 1 | 1 | 1 |

Further, as shown in Table 2, 18 columns are represented by the column address bits c9, c8, c7, c6, and c5. It should be noted that the columns are identically represented by the column address bits c9, c8, c7, c6 and c5, at the different data rate.

<TABLE 2>

| | Bits | | | | |
|---|---|---|---|---|---|
| Col | c9 | c8 | c7 | c6 | c5 |
| 1 | 0 | 0 | 0 | 0 | 0 |
| 2 | 0 | 0 | 0 | 0 | 1 |
| 3 | 0 | 0 | 0 | 1 | 0 |
| 4 | 0 | 0 | 0 | 1 | 1 |
| 5 | 0 | 0 | 1 | 0 | 0 |
| 6 | 0 | 0 | 1 | 0 | 1 |
| 7 | 0 | 0 | 1 | 1 | 0 |
| 8 | 0 | 0 | 1 | 1 | 1 |
| 9 | 0 | 1 | 0 | 0 | 0 |
| 10 | 0 | 1 | 0 | 0 | 1 |
| 11 | 0 | 1 | 0 | 1 | 0 |
| 12 | 0 | 1 | 0 | 1 | 1 |
| 13 | 0 | 1 | 1 | 0 | 0 |
| 14 | 0 | 1 | 1 | 0 | 1 |
| 15 | 0 | 1 | 1 | 1 | 0 |
| 16 | 0 | 1 | 1 | 1 | 1 |
| 17 | 1 | 0 | 0 | 0 | 0 |
| 18 | 1 | 0 | 0 | 0 | 1 |

That is, 576 addresses shown in FIG. 2 are represented by a combination of the column address bits c9, c8, c7, c6 and c5, and the row address bits c4, c3, c2, c1, and c0. For example, an address at the first column and the first row is represented by a combination of the column address bits 00000 and the row address bits 00000. FIG. 7 illustrates an interleave read address generator for generating the interleave read address in the sequence of the interleave read address for the data rate of 9600 bps and 14400 bps.

In operation, base-18 counter 18CNT1 counts a clock input to generate a count value of the column address bits c9, c8, c7, c6 and c5, in which the column address bit c5 is the least significant bit (LSB) and the column address bit c9 is the most significant bit (MSB). Here, the count value represents the column address, and increases from 00000 corresponding to the first column to 10001 corresponding to the eighteenth column.

Base-18 counter 18CNT1 generates a carry at a carry output terminal thereof when the count value changes from 10001 to 00000. The carry output from base-18 counter 18CNT1 is applied to an enable terminal of base-32 counter 32CNT1. Upon receiving the carry output from base-18 counter 18CNT1, base-32 counter 32CNT1 is enabled to count the clock and generate a count value of the row address bits c4, c3, c2, c1 and c0, in which the row address bit c0 is the least significant bit (LSB) and the row address bit c4 is the most significant bit (MSB). Here, the count value represents the row address, and sequentially increases from 00000 corresponding to the first row to 11111 corresponding to the thirty-second column.

As described above, base-18 counter 18CNT1 counts the clock from 00000 to 10001, to generate the column addresses 1, 33, 65, 129, 161, . . . , and 545 shown in FIG. 2. Base-18 counter 18CNT 1 generates the carry when the count value changes from 10001 to 00000. Then, upon receiving the carry output from base-18 counter 18CNT1, base-32 counter 32CNT1 counts the clock to generate a count value of 00001. At the moment, base-18 counter 18CNT1 again counts the clock from 00000 to 10001, to generate the column addresses 2, 34, 66, 98, 130, . . . , and 546. In this manner, the interleave read address generator shown in FIG. 7 generates the interleave read addresses up to 576.

FIG. 3 illustrates a data arrangement when the data is written in the interleave memory at the data rate of 4800 bps and 7200 bps in accordance with Standard SP-3384 for the CDMA PCS mobile station. Although the addresses in the interleave memory are the same as those in case of 9600 bps and 14400 bps, the data rate of 4800 bps and 7200 bps is twice lower than the data rate of 9600 bps and 14400 bps. Accordingly, the data to be written into the interleave memory at the data rate of 4800 bps and 7200 bps are written at two sequential addresses. Therefore, the same data appears twice with respect to the whole data, as shown in FIG. 3. However, the data is interleaved by the address unit during the interleaving.

The data written sequentially into two addresses are read out according to the interleave read address, and the reading sequence of the rows of the interleave read addresses is illustrated in FIG. 6. Namely, FIG. 6 exclusively illustrates a sequence of the row addresses out of the interleave read addresses. As illustrated, the reading sequence of the rows at the data rate of 4800 bps and 7200 bps is 1,3,2,4,5, . . . , and 32.

That is, the reading sequence at the data rate of 4800 bps and 7200 bps is 1, 33, 65, 129, . . . , 545, 2, 34, . . . , and 576. It is noted that the column sequence is the same as that in case of the data rate of 9600 bps and 14400 bps, but the row sequence is changed. The row address bits c4, c3, c2, c1 and c0 according to the reading sequence of the rows are represented by 00000, 00010, 00001, 00011, 00100, 00110, . . . and 11111.

In general, a counter toggles the least significant bit (e.g., the bit c0) between 0 and 1, and toggles the next bit to least significant bit (i.e., the bit c1) when the least significant bit c0 is toggled from 1 to 0. However, at the data rate of 4800 bps and 7200 bps, the row address bit c1 is first toggled and then toggled in the sequence of the row address bits c0, c2, c3, and c4. Therefore, the interleave read address generator for the data rate of 4800 bps and 7200 bps can be realized by changing the output of the interleave read address generator for the data rate of 9600 bps and 14400 bps. Namely, the output bits c0 and c1 of the interleave read address generator for the data rate of 9600 bps and 14400 bps are exchanged with each other to realize the interleave read address generator for the data rate of 4800 bps and 7200 bps.

Figure 8:
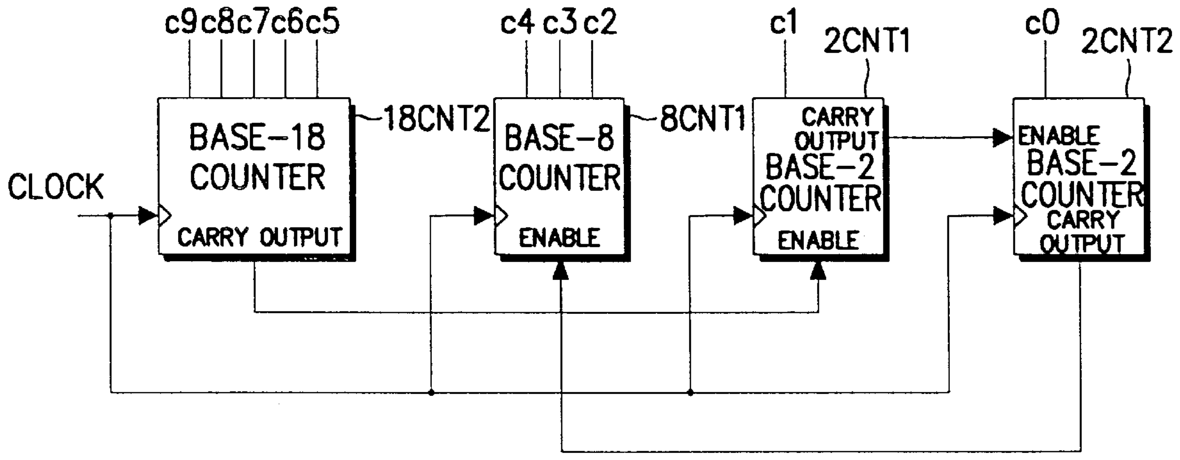
FIG. 8 is a diagram of an interleave read address generator for generating an interleave read address for reading data at the data rate of 4800 bps and 7200 bps according to an embodiment of the present invention.

FIG. 8 illustrates the interleave read address generator for data rate of 4800 bps and 7200 bps. The interleave read address generator generates the interleave read address in the sequence of the interleave read address. The interleave read address generator includes a base-18 counter 18CNT2, an octal (base-8) counter 8CNT1, and binary (base-2) counters 2CNT1 and 2CNT2. Base-18 counter 18CNT2 generates the column address bits c9, c8, c7, c6 and c5 and a carry output in the same manner as base-18 counter 18CNT1 shown in FIG. 7, of the interleave read address generator for 9600 bps and 14400 bps. The carry output from base-18 counter 18CNT2 is applied to an enable terminal of binary counter 2CNT1 which receives the clock at a clock terminal thereof. Thus, whenever the carry output is received from base-18 counter 18CNT2, binary counter 2CNT1 counts the clock to generate the row address bit c1. Binary counter 2CNT1 generates a carry when the row address bit output c1 is changed from 1 to 0. The carry output from binary counter 2CNT1 is applied to an enable terminal of binary counter 2CNT2 which receives the clock at a clock terminal thereof. Thus, binary counter 2CNT2 counts the clock to generate the row address bit c0, whenever binary counter 2CNT1 generates the carry. Binary counter 2CNT2 generates a carry whenever the row address bit output c0 changes from 1 to 0. The carry output from binary counter 2CNT2 is applied to an enable terminal of octal counter 8CNT1 which receives the clock at a clock terminal thereof. Thus, whenever binary counter 2CNT2 generates the carry output, the octal counter 8CNT1 counts the clock to generate the row address bits c4, c3, and c2. Therefore, the interleave read address is generated in combination of the column address bits c9, c8, c7, c6 and c5 of base-18 counter 18CNT2, the row address bits c4, c3 and c2 of the octal counter 8CNT1, the row address bit c1 of the binary counter 2CNT1, and the row address bit c0 of binary counter 2CNT2.

FIG. 4 illustrates a data arrangement when the data is written into the interleave memory at the data rate of 2400 bps and 3600 bps in accordance with Standard SP-3384 for the CDMA PCS mobile station. Although the addresses in the interleave memory are the same as those in case of 9600 bps and 14400 bps, the data rate of 2400 bps and 3600 bps is four times lower than the data rate of 9600 bps and 14400 bps. Accordingly, the data to be written into the interleave memory at the data rate of 2400 bps and 3600 bps are written at four sequential addresses. Therefore, the same data appears four times with respect to the whole data, as shown in FIG. 4. However, the data is interleaved by the address unit during the interleaving.

The data written sequentially into four addresses are read out according to the interleave read address during the interleaving, and the sequence of the rows of the interleave read addresses is illustrated in FIG. 6. Namely, FIG. 6 exclusively illustrates a sequence of the row addresses out of the interleave read addresses. As illustrated, the reading sequence of the rows at the data rate of 2400 bps and 3600 bps is 1, 5, 2, 6, 3, 7, 4, 8, 9, 13, . . . , and 32.

That is, the reading sequence at the data rate of 2400 bps and 3600 bps is to read 18 columns at the first row and then 18 columns at the fifth row, etc. It is noted that the column sequence is the same as that in case of the data rate of 9600 bps and 14400 bps, but the row sequence is changed. The row address bits c4, c3, c2, c1 and c0 according to the reading sequence of the rows are represented by 00000, 00100, 00001, 00101, 000110, 0010, . . . and 11111.

Figure 9:
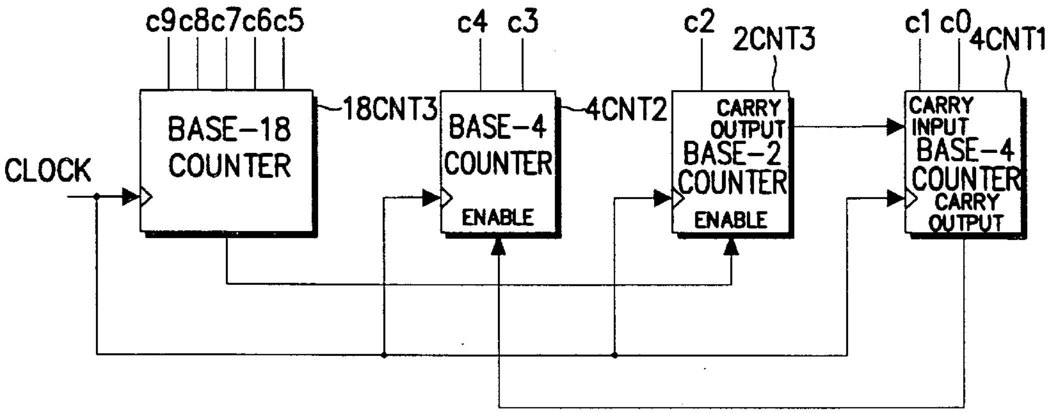
FIG. 9 is a diagram of an interleave read address generator for generating an interleave read address for reading data at the data rate of 2400 bps and 3600 bps according to an embodiment of the present invention.

It is noted from the foregoing descriptions that at the data rate of 2400 bps and 3600 bps, the row address bit c2 is first toggled and then toggled in the sequence of the bits c0, c1, c3, and c4. Therefore, the interleave read address generator for the data rate of 2400 bps and 3600 bps can be realized by changing the output of the interleave read address generator for the data rate of 9600 bps and 14400 bps. Namely, the output bits c0, c1 and c2 of the interleave read address generator for the data rate of 9600 bps and 14400 bps are changed respectively to the bits c2, c0 and c1 to realize the interleave read address generator for the data rate of 2400 bps and 3600 bps. FIG. 9 illustrates the interleave read address generator for the data rate of 2400 bps and 3600 bps. The interleave read address generator generates the interleave read address in the sequence of the interleave read address. The interleave read address generator includes a base-18 counter 18CNT3, base-4 counters 4CNT1 and 4CNT2, and a binary (base-2) counter 2CNT3. Base-18 counter 18CNT3 generates the column address bits c9, c8, c7, c6 and c5 and a carry output in the same manner as base-18 counter 18CNT1 shown in FIG. 7, of the interleave read address generator for 9600 bps and 14400 bps. The carry output from base-18 counter 18CNT3 is applied to an enable terminal of binary counter 2CNT3 which receives the clock at a clock terminal thereof. Thus, whenever base-18 counter 18CNT3 generates the carry output, binary counter 2CNT3 counts the clock to generate the address bit c2. Binary counter 2CNT3 generates a carry when the address bit c2 is changed from 1 to 0. The carry output from binary counter 2CNT3 is applied to an enable terminal of base-4 counter 4CNT1 which receives the clock at a clock terminal thereof. Thus, base-4 counter 4CNT1 counts the clock to generate the address bits c1 and c0, whenever binary counter 2CNT3 generates the carry. Base-4 counter 4CNT1 generates a carry whenever the address bits c1 and c0 change from 11 to 00. The carry output from base-4 counter 4CNT1 is applied to an enable terminal of base-4 counter 4CNT2 which receives the clock at a clock terminal thereof. Thus, whenever base-4 counter 4CNT1 generates the carry, base-4 counter 4CNT2 counts the clock to generate the address bits c4 and c3. Therefore, the interleave read address is generated in combination of the address bits c9, c8, c7, c6, c5 of base-18 counter 18CNT3, the addr c3 of base-4 4CNT2, the address bit c2 of binary counter 2CNT3, and the address bits c1 and c0 of base-4 counter 4CNT1.

FIG. 5 illustrates a data arrangement when the data is written into the interleave memory at the data rate of 1200 bps and 1800 bps in accordance with Standard SP-3384 for the CDMA PCS mobile station. Although the addresses in the interleave memory are the same as those in case of 9600 bps and 14400 bps, the data rate of 1200 bps and 1800 bps is eight times lower than the data rate of 9600 bps and 14400 bps. Accordingly, the data to be written into the interleave memory at the data rate of 1200 bps and 1800 bps are written at eight sequential addresses. Therefore, the same data appears eight times with respect to the whole data, as shown in FIG. 5. However, the data is interleaved by the address unit during the interleaving.

The data written sequentially into eight addresses are read out according to the interleave read address during the interleaving, and the sequence of the rows of the interleave read addresses is illustrated in FIG. 6. Namely, FIG. 6 exclusively illustrates a sequence of the row addresses out of the interleave read addresses. As illustrated, the reading sequence of the rows at the data rate of 1200 bps and 1800 bps is 1, 9, 2,10, 3, 11, 4, 12, 5, . . . , and 32.

That is, the reading sequence at the data rate of 1200 bps and 1800 bps is to read 18 columns at the row and then 18 columns at the ninth row, etc. It is noted that the column sequence is the same as that in case of the data rate of 9600 bps and 14400 bps, but the row sequence is changed. The row address bits c4, c3, c2, c1 and c0 according to the reading sequence of the rows are represented by 00000, 01000, 00001, 01001, 00010, 01011, . . . and 11111.

It is noted from the foregoing descriptions that at the data rate of 1200 bps and 1800 bps, the bit c3 is first toggled and then toggled in the sequence of the bits c0, c1, c2 and c4. Therefore, the interleave read address generator for the data rate of 1200 bps and 1800 bps can be realized by changing the output of the interleave read address generator for the data rate of 9600 bps and 14400 bps. Namely, the output bits c0, c1, c2 and c3 of the interleave read address generator for the data rate of 9600 bps and 14400 bps are changed respectively to c3, c0, c1 and c2 to realize the interleave read address generator for the data rate of 1200 bps and 1800 bps.

Figure 10:
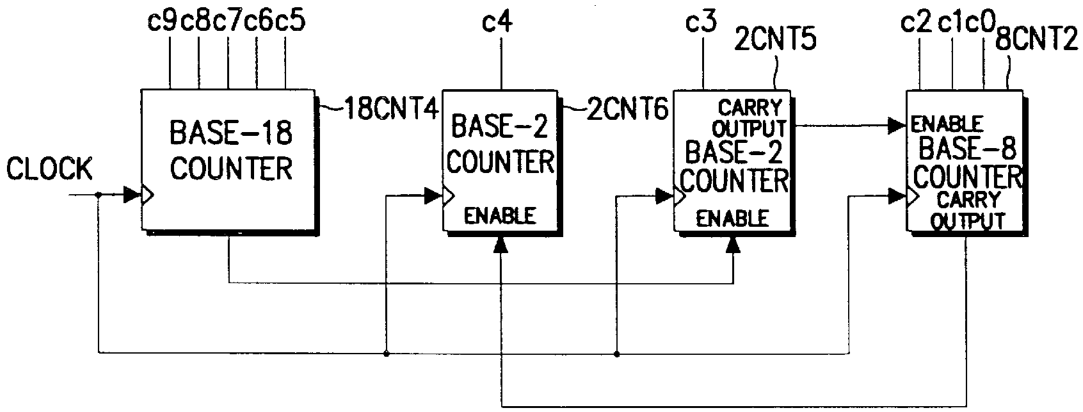
FIG. 10 is a diagram of an interleave read address generator for generating an interleave read address for reading data at the data rate of 1200 bps and 1800 bps according to an embodiment of the present invention.

FIG. 10 illustrates the interleave read address generator for the data rate of 1200 bps and 1800 bps. The interleave read address generator generates the interleave read address in the sequence of the interleave read address. The interleave read address generator includes a base-18 counter 18CNT4, binary counters 2CNT5 and 2CNT6, and an octal (base-8) counter 8CNT2. Base-18 counter 18CNT4 generates the column address bits c9, c8, c7, c6 and c5 and a carry output in th same manner as base-18 counter 18CNT1 shown in FIG. 7, of the interleave read address generator for 9600 bps and 14400 bps. The carry output from base-18 counter 18CNT4 is applied to an enable terminal of binary counter 2CNT5 which receives the clock at a clock terminal thereof. Thus, whenever base-18 counter 1 8CNT4 generates the carry output, binary counter 2CNT5 counts the clock to generate the address bit c3. Binary counter 2CNT5 generates a carry when the address bit c3 is changed from 1 to 0. The carry output from binary counter 2CNT5 is applied to an enable terminal of octal counter 8CNT2 which receives the clock at a clock terminal thereof. Thus, octal counter 8CNT2 counts the clock to generate the address bits c2, c1 and c0, whenever binary counter 2CNT5 generates the carry. Octal counter 8CNT2 generates a carry whenever the address bits c2, c1 and c0 change from 111 to 000. The carry output from octal counter 8CNT2 is applied to an enable terminal of binary counter 2CNT6 which receives the clock at a clock terminal thereof. Thus, whenever octal counter 8CNT2 generates the carry, binary counter 2CNT6 counts the clock to generate the address bit c4. Therefore, the interleave read address is generated using a combination of the address bits c9, c8, c7, c6 and c5 of base-18 counter 18CNT4, the address bit counter 2CNT6, the address bit c3 of binary counter 2CNT5, and the address bits c2, c1 and c0 of octal counter 8CNT2.

As described above, the interleave read address can be freely generated according to the data rates by simply changing the output of the interleave read address generator of 9600 bps and 14400 bps shown in FIG. 7. Therefore, it is possible to realize the interleave read address generator for every data rate by simply changing the input of the interleave read address generator of 9600 bps and 14400 bps shown in FIG. 7 according to the data rates.

Figure 11:
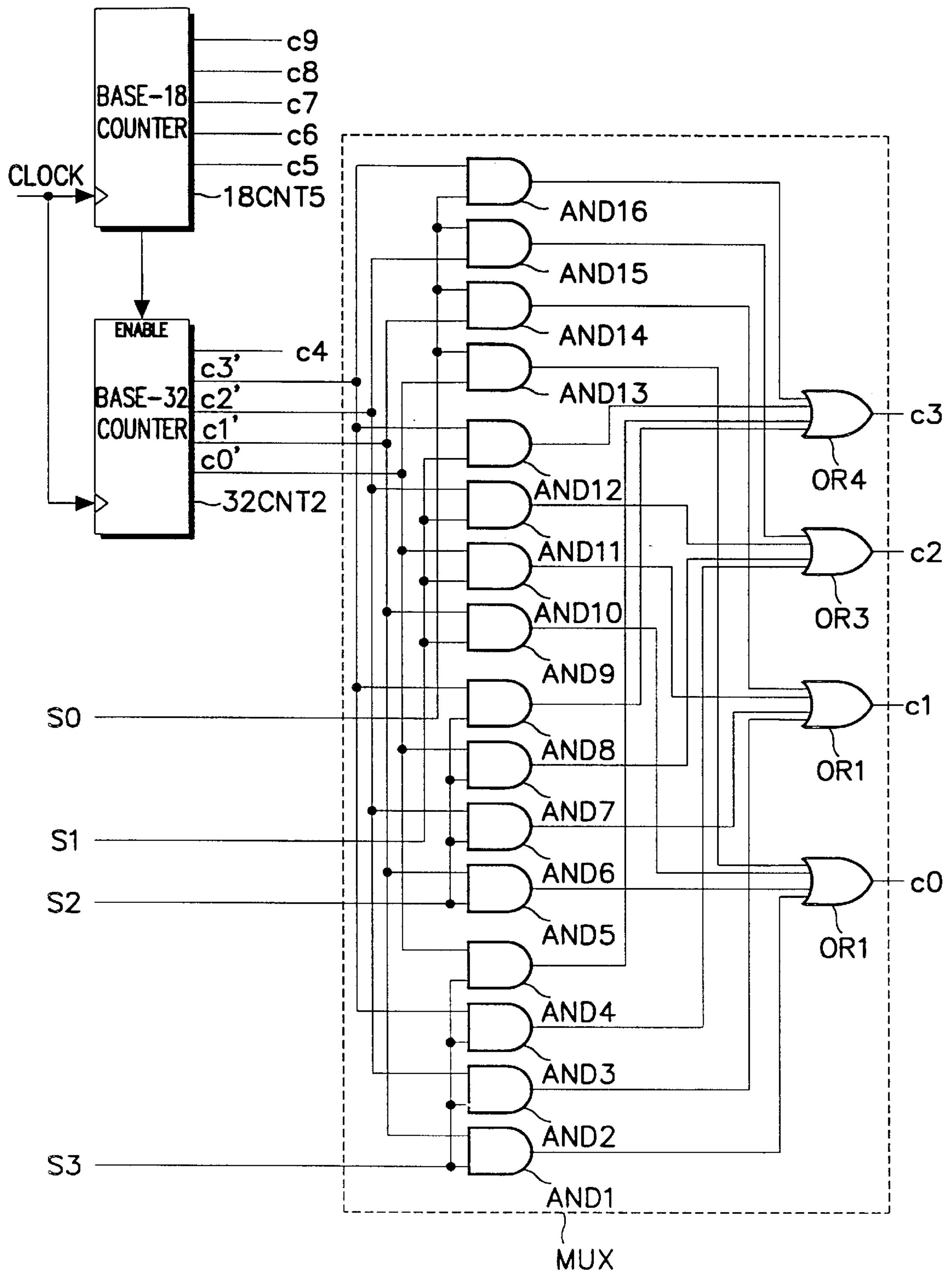
FIG. 11 is a diagram of a variable interleave read address generator for generating an interleave read address for reading data at a variable data rate according to another embodiment of the present invention.

FIG. 11 illustrates a variable interleave read address generator for generating the interleave read address according to another embodiment of the present invention. As illustrated, the variable interleave read address generator includes a base-18 counter 18CNT5, a base-32 counter 32CNT2, and a multiplexer MUX. Base-18 counter 18CNT5 generates the column address bits c9, c8, c7, c6 and c5 and a carry output in the same manner as base-18 counter 18CNT1 shown in FIG. 7, of the interleave read address generator for 9600 bps and 14400 bps. The carry output from base-18 counter 18CNT5 is applied to an enable terminal of base-32 counter 32CNT2 which receives the clock at a clock terminal thereof. Thus, wheneverbase-18 counter 18CNT5 generates the carry output, base-32 counter 32CNT2 counts the clock to generate the address bits c4, c3', c2', c1' and c0'. Multiplexer MUX receives the address bits c3', c2', c1' and c0' from base-32 counter 32CNT2, to generate the address bits c3, c2, c1 and c0 according to data rate selection signals S3, S2, S1 and S0. Table 3 represents a truth table of multiplexer MUX.

<TABLE 3>

| Data Rates | S3 | S2 | S1 | S0 | c3 | c2 | c1 | c0 |
|---|---|---|---|---|---|---|---|---|
| 9600 & 14400 bps | 1 | 0 | 0 | 0 | c3' | c2' | c1' | c0' |
| 4800 and 7200 bps | 0 | 1 | 0 | 0 | c3 | c2' | c0' | c1' |
| 2400 and 3600 bps | 0 | 0 | 1 | 0 | c3' | c0' | c2' | c1' |
| 1200 and 1800 bps | 0 | 0 | 0 | 1 | c0' | c3' | c2' | c1' |

As can be appreciated from Table 3, multiplexer MUX generates different address bits c3, c2, c1 and c0 according to the data rate selection signals S3, S2, S1 and S0. For example, when the data rate of 9600 bps and 14400 bps, multiplexer MUX generates the data bits c3', c2', c1' and c0' at the output terminals c3, c2, c1 and c0, respectively. At the moment, the interleave read address generator has the same function as the interleave read address generator of FIG. 7. The interleave read address for 9600 bps and 14400 bps is generated with the combination of the address bits c9, c8, c7, c6 and c5 of base-18 counter 18CNT5, the address bit c4 of base-32 counter 32CNT2, and th address bits c3, c2, c1 and c0 of the multiplexer MUX.

Further, when the data rate is 4800 bps and 7200 bps, multiplexer MUX generates the data bits c3', c2', c0' and c1'0 at the output terminals c3, c2, c1 and c0, respectively. At the moment, the interleave read address generator has the same function as the interleave read address generator of FIG. 8. The interleave read address for 4800 bps and 7200 bps is generated with the combination of the address bits c9, c8, c7, c6 and c5 of base-18 counter 18CNT5, the address bit c4 of base-32 counter 32CNT2, and the address bits c3, c2, c1 and c0 of the multiplexer MUX.

When the data rate is 2400 bps and 3600 bps, the multiplexer MUX generates the data bits c', c0', c2' and c1' at the output terminals c3, c2, c1 and c0, respectively. At the moment, the interleave read address generator has the same function as the interleave read address generator of FIG. 9. The interleave read address for 2400 bps and 3600 bps is generated with the combination of the address bits c9, c8, c7, c6 and c5 of base-18 counter 18CNT5, the address bit c4 of base-32 counter 32CNT2, and the address bits c3, c2, c1 and c0 of the multiplexer MUX.

Moreover, when the data rate is 1200 bps and 1800 bps, the multiplexer MUX generates the data bits c0', c3', c2' and c1 ' at the output terminals c3, c2, c1 and c0, respectively. At the moment, the interleave read address generator has the same function as the interleave read address generator of FIG. 10. The interleave read address for 1200 bps and 1800 bps is generated with the combination of the address bits c9, c8, c7, c6 and c5 of base-18 counter 18CNT5, the address bit c4 of base-32 counter 32CNT2, and the address bits c3, c2, c1 and c0 of the multiplexer MUX.

Multiplexer MUX is composed of AND gates AND1-AND 16 and OR gates OR1–OR4. The address bit c0' from base-32 counter 32CNT2 is applied to AND gates AND4, AND7, AND10 and AND13. The address bit c1' from base-32 counter 32CNT2 is applied to AND gates AND1, AND5, AND9 and AND14. The address bit c2' from base-32 counter 32CNT2 is applied to AND gates AND2, AND6, AND1 and AND15. And, the address bit c3' from base-32 counter 32CNT2 is applied to AND gates AND3, AND8, AND12 and AND16.

The data rate selection signal S3 is commonly applied to the AND gates AND1–AND4. Thus, the set of the AND gates AND1–AND4 generates the address bits c0', c3', c2' and c1' at the output terminals c3, c2, c1 and c0 respectively in response to the data rate selection signal S3 of the logic high level, so as to generate the interleave read address for 1200 bps and 1800 bps.

Similarly, the data rate selection signal S2 is commonly applied to AND gates AND5–AND8. Thus, the set of AND gates AND5–AND8 generates the address bits c3', c0', c2' and c1' at the output terminals c3, c2, c1 and c0 respectively in response to the data rate selection signal S2 of the logic high level, so as to generate the interleave read address for 2400 bps and 3600 bps.

The data rate selection signal S1 is commonly applied to AND gates AND9–AND12. Thus, the set of AND gates AND–AND12 generates the address bits c3', c2', c0' and c1' at the output terminals c3, c2, c1 and c0 respectively in response to the data rate selection signal S1 of the logic high level, so as to generate the interleave read address for 4800 bps and 7200 bps.

Further, the data rate selection signal S0 is commonly applied to AND gates AND13–AND16. Thus, the set of AND gates AND13–AND16 generates the address bits c3', c2', c1' and c0' at the output terminals c3, c2, c1 and c0 respectively in response to the data rate selection signal S1 of the logic high level, so as to generate the interleave read address for 9600 bps and 14400 bps.

The OR gate OR1 receives the outputs from AND gates AND1, AND5, AND9 and AND13 to generate the address bit c3. OR gate OR2 receives the outputs from AND gates AND2, AND6, AND10 and AND14 to generate the address bit c2. OR gate OR3 receives the outputs from AND gates AND3, AND7, AND11 and AND15 to generate the address bit c1. And, OR gate OR4 receives the outputs from AND gates AND4, AND8, AND12 and AND16 to generate the address bit c0.

As described in the foregoing, the interleave read address generator of the invention is realized by inexpensive counters. Further, a variable interleave read address generator of the invention includes a multiplexer to generate the variable interleave read address for various data rates. Therefore, it is possible to provide the interleave read address generator at a low cost.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. An interleave read address generator comprising:

a base-18 counter for counting a clock input to generate column address bits; and a base-32 counter being enabled in response to a carry output from said base-18 counter, for counting the clock input to generate row address bits.

2. The interleave read address generator according to claim 1, wherein said interleave read address generator generates an interleave read address for a data rate of 9600 bps and 14400 bps.

3. The interleave read address generator according to claim 1, wherein said interleave read address generator exchanges a least significant bit (LSB) of said base-32 counter with a least significant bit plus one bit (LSB+1) of said base-32 counter, to generate an interleave read address for a data rate of 4800 bps and 7200 bps.

4. The interleave read address generator according to claim 3, further comprising a multiplexer responsive to a data rate selection signal for exchanging said least significant bit (LSB) of said base-32 counter with said least significant bit plus one bit (LSB+1) of said base-32 counter, to generate said interleave read address for a data rate of 4800 bps and 7200 bps.

5. The interleave read address generator according to claim 1, wherein said interleave read address generator changes a least significant bit (LSB) of said base-32 counter to the least significant bit plus two bits (LSB+2) of said base-32 counter, changes the least significant bit plus one bit (LSB+1) to the least significant bit (LSB) and changes the least significant bit plus two bits (LSB+2) to the least significant bit plus one bit (LSB+1), so as to generate an interleave read address for a data rate of 2400 bps and 3600 bps.

6. The interleave read address generator according to claim 5, further comprising a multiplexer responsive to a data rate selection signal for changing said least significant bit (LSB) of said base-32 counter to the least significant bit plus two bits (LSB+2) of said base-32 counter, for changing the least significant bit plus one bit (LSB+1) to the least significant bit (LSB) and for changing the least significant bit plus two bits (LSB+2) to the least significant bit plus one bit (LSB+1), so as to generate said interleave read address for said data rate of 2400 bps and 3600 bps.

7. The interleave read address generator according to claim 1, wherein said interleave read address generator changes a least significant bit (LSB) of said base-32 counter to the least significant bit plus three bits (LSB+3) of said base-32 counter, changes the least significant bit plus one bit (LSB+1) to the least significant bit (LSB), changes the least significant bit plus two bits (LSB+2) to the least significant bit plus one bit (LSB+1) and changes the least significant bit plus three bits (LSB+3) to the least significant bit plus two bits (LSB+2), so as to generate an interleave read address for a data rate of 1200 bps and 1800 bps.

8. The interleave read address generator according to claim 7, further comprising a multiplexer responsive to a data rate selection signal for changing said least significant bit (LSB) of said base-32 counter to the least significant bit plus three bits (LSB+3) of said base-32 counter, for changing the least significant bit plus one bit (LSB+1) to the least significant bit (LSB), for changing the least significant bit plus two bits (LSB+2) to the least significant bit plus one bit (LSB+1) and for changing the least significant bit plus three bits (LSB+3) to the least significant bit plus two bits (LSB+2), so as to generate said interleave read address for said data rate of 1200 bps and 1800 bps.

9. An interleave read address generator comprising:

a base-18 counter for counting a clock input to generate column address bits; and a base-32 counter being enabled in response to a carry output from said base-18 counter, for counting the clock input to generate a count value; and a multiplexer for changing a position of output bits of said base-32 counter according to first through fourth data rate selection signals, to variably generate row address bits.

10. The interleave read address generator according to claim 9, wherein said multiplexer outputs the output bits of said base-32 counter in response to a first data rate selection signal, to generate an interleave read address for a data rate of 9600 bps and 14400 bps.

11. The interleave read address generator according to claim 9, wherein said multiplexer exchanges a least significant bit (LSB) of said base-32 counter with a least significant bit plus one bit (LSB+1) in response to a second data rate selection signal, to generate an interleave read address for a data rate of 4800 bps and 7200 bps.

12. An interleave read address generator according to claim 9, wherein, in response to a third data rate selection signal, said multiplexer changes a least significant bit (LSB) of said base-32 counter to the least significant bit plus two bits (LSB+2), changes the least significant bit plus two bits (LSB+2) to the least significant bit plus one bit (LSB+1) and changes the least significant bit plus one bit (LSB+1) to the least significant bit, so as to generate an interleave read address for a data rate of 2400 bps and 3600 bps.

13. An interleave read address generator according to claim 9, wherein, in response to a fourth data rate selection signal, said multiplexer changes a least significant bit (LSB) of said base-32 counter to the least significant bit plus three bits (LSB+3), changes the least significant bit plus three bits (LSB+3) to the least significant bit plus two bits (LSB+2), changes the least significant bit plus two bits (LSB+2) to the least significant bit plus one bit (LSB+1) and changes the least significant bit plus one bit (LSB+1) to the least significant bit, so as to generate an interleave read address for a data rate of 1200 bps and 1800 bps.

14. An interleave read address generator comprising:

a base-18 counter having a clock terminal for counting a clock input to generate column address bits; and a base-32 counter having an enable terminal connected to a carry output of said base-18 counter and a clock terminal for counting said clock input, said base-32 counter being enabled in response to said carry output from said base-18 counter to count the clock input to generate row address bits.

15. The interleave read address generator according to claim 14, wherein said interleave read address generator generates an interleave read address for a data rate of 9600 bps and 14400 bps.

16. The interleave read address generator according to claim 14, further comprising a multiplexer for changing a position of said row address bits generated by said base-32 counter according to first through fourth data rate selection signals, to variably generate row address bits.

17. The interleave read address generator according to claim 16, wherein said multiplexer outputs the output bits of said base-32 counter in response to a first data rate selection signal, to generate an interleave read address for a data rate of 9600 bps and 14400 bps.

18. The interleave read address generator according to claim 16, wherein said multiplexer exchanges a least significant bit (LSB) of said base-32 counter with a least significant bit plus one bit (LSB+1) in response to a second data rate selection signal, to generate an interleave read address for a data rate of 4800 bps and 7200 bps.

19. The interleave read address generator according to claim 16, wherein, in response to a third data rate selection signal, said multiplexer chances a least significant bit (LSB) of said base-32 counter to the least significant bit plus two bits (LSB+2), changes the least significant bit plus two bits (LSB+2) to the least significant bit plus one bit (LSB+1) and changes the least significant bit plus one bit (LSB+1) to the least significant bit, so as to generate an interleave read address for a data rate of 2400 bps and 3600 bps.

20. The interleave read address generator according to claim 16, wherein, in response to a fourth data rate selection signal, said multiplexer changes a least significant bit (LSB) of said base-32 counter to the least significant bit plus three bits (LSB+3), changes the least significant bit plus three bits (LSB+3) to the least significant bit plus two bits (LSB+2), changes the least significant bit plus two bits (LSB+2) to the least significant bit plus one bit (LSB+1) and changes the least significant bit plus one bit (LSB+1) to the least significant bit, so as to generate an interleave read address for a data rate of 1200 bps and 1800 bps.

* * * * *